(12) United States Patent
Lee et al.

(10) Patent No.: US 6,342,461 B1
(45) Date of Patent: Jan. 29, 2002

(54) CERAMIC COMPOSITION MADE FROM WASTE MATERIALS AND METHOD FOR MANUFACTURING THE SAME

(76) Inventors: Ki-Gang Lee, 502-707 Jookong Apartment, Byolyang-Dong, Kwacheon, Kyonggi-Do; Jung-Hwan Kim, 63-113 Hangkangro 3 Ga, Yongsan-Ku, Seoul, both of (KR)

( * ) Notice: Subject to any disclaimer, the term of this patent is extended or adjusted under 35 U.S.C. 154(b) by 0 days.

(21) Appl. No.: 09/417,547

(22) Filed: Oct. 14, 1999

(30) Foreign Application Priority Data

Oct. 15, 1998 (KR) ............................................. 98-43209

(51) Int. Cl.⁷ ........................... C04B 33/04; C04B 35/00
(52) U.S. Cl. ........................... 501/141; 501/155; 588/9; 588/10; 588/256; 588/901
(58) Field of Search ................................. 106/705, 707; 501/141, 155; 264/680, DIG. 49; 588/9, 10, 256, 901

(56) References Cited

U.S. PATENT DOCUMENTS

| | | | | |
|---|---|---|---|---|
| 2,576,565 A | * | 11/1951 | Brown | ........................ 501/155 |
| 2,987,411 A | * | 6/1961 | Minnick | ...................... 106/705 |
| 3,886,244 A | * | 5/1975 | Bayer et al. | .................. 264/63 |
| 5,268,131 A | * | 12/1993 | Harrison | ...................... 264/44 |
| 5,278,111 A | * | 1/1994 | Frame | ......................... 501/155 |
| 5,342,442 A | * | 8/1994 | Nechvatral et al. | ......... 106/705 |
| 5,362,319 A | * | 11/1994 | Johnson | ...................... 106/705 |
| 5,583,079 A | * | 12/1996 | Golitz et al. | ................. 501/155 |
| 5,810,920 A | * | 9/1998 | Ueshima et al. | ............. 106/705 |
| 5,830,251 A | * | 11/1998 | Simpson et al. | ............. 501/155 |

* cited by examiner

*Primary Examiner*—Michael Marcheschi
(74) *Attorney, Agent, or Firm*—Rabin & Berdo (57) ABSTRACT

A ceramic composition made from waste materials and a method for manufacturing the same are disclosed. The ceramic composition comprises between 5 and 75 by weight part of a solid stated waste material including heavy metals, between 15 and 45 by weight part of a fly ash and between 5 and 55 by weight part of a clay. The ceramic composition is manufactured by compositely stabilizing various waste materials and is available for a building material or an engineering material. Therefore, the waste materials are effectively recycled without causing environmental pollution.

12 Claims, 2 Drawing Sheets

CERAMIC COMPOSITION MADE FROM WASTE MATERIALS AND METHOD FOR MANUFACTURING THE SAME

BACKGROUND OF THE INVENTION

1. Field of the Invention

The present invention relates to a ceramic composition by a composite stabilization process and by using waste materials including heavy metals for recycling the waste materials and a method for manufacturing the same, more particularly the present invention relates to the ceramic composition made from various waste materials such as an electric arc furnace (EAF) dust, a steel slag, an aluminum dross, a fly ash, a paper ash or other industrial dusts in order to utilize the ceramic composition for building materials or engineering materials and the method for manufacturing the ceramic composition.

2. Description of the Prior Art

Various waste materials generated from the industrial activities are generally divided into two groups. One group consists of specific waste materials which include hazardous elements and the other group consists of ordinary waste materials having little harmful elements.

Many heavy metals like iron (Fe), magnesium (Mg), titanium (Ti), lead (Pb), chrome (Cr), copper (Cu), nickel (Ni) or manganese (Mn). The heavy metals are erupted from the specific waste materials when the specific waste materials are buried in the ground according to an ordinary treating method, so fatal environment pollution may occur due to the heavy metals. Also, a cost and a reclaimed land for the waste materials become serious problems though the heavy metals are partially removed from the specific waste materials or the ordinary waste materials are buried in the ground. Therefore, a method for treating and recycling the waste materials is urgently demanded at present.

Hereinafter, several patents for recycling the waste materials will be mentioned as follows.

Japanese Patent No. 53-127,511 discloses one method for manufacturing a block by mixing an EAF dust with the conventional row materials. The block includes the EAF dust of 30 to 50 by weight percent and a sintering process is executed at a temperature of 630 to 830° C. However, the block has a poor compressive strength of about 690 psi.

Another method for manufacturing a block is disclosed at U.S. Pat. No. 5,278,111 issued to Frame. The block contains an EAF dust of 30 to 60 by weight percent around the conventional row material after zinc (Zn) and lead (Pb) in the EAF dust are considerably volatilized through a calcination process. Though the block meets the permissible eruption limits of the heavy metals, the mechanical strength of the block decreases according as the amount of the EAF dust increases.

Also, a method for manufacturing a clinker is suggested at U.S. Pat. No. 5,672,146 issued to Aota et al. The clinker comprises an EAF dust and an alumina and heavy metals are hardly erupted from the clinker. The clinker is used as a row material to produce a tile or a block after it is grinded. The method, however, demands the milling process after a sintering step and the mechanical strength is not mentioned in that Patent.

As it is described above, those patents have the problem that the sintered bodies or the blocks have poor mechanical strength because homogeneous mixture is not formed during mixing the waste materials with the conventional row materials. Also, those patents mention only the specific waste materials except the ordinary waste materials such as the fly ash or the paper ash. Furthermore, a liquid phase excessively increases and the softening of the sintered body occurs since the main ingredients of the EAF dust likewise metals or metal oxides react with the conventional row materials such as a clay and they together form the liquid phase.

Therefore, in case of treating solid state waste materials having the hazardous heavy metals and the harmful ingredients, a treating and recycling method should be developed so as to manufacture a ceramic composition which has a high mechanical strength and can be available for various building materials or engineering materials by sufficiently mixing the ingredients of the waste materials while the heavy metals are not erupted from the ceramic composition.

SUMMARY OF THE INVENTION

Considering the above-mentioned problems, the present inventors have researched and developed a method for effectively treating and recycling waste materials having hazardous ingredients. As a result, the present inventors have accomplished a ceramic composition which can be available for a building material or an engineering material by a composite stabilization method without the eruption of hazardous heavy metals from the ceramic composition.

It is a first object of the present invention to provide a ceramic composition made from waste materials by a composite stabilization process in order to recycle waste materials such as an electric arc furnace dust, a steel slag, a fly ash, paper ash, an aluminum dross and so on.

It is a second object of the present invention to provide a method for manufacturing a ceramic composition made from waste materials by a composite stabilization process in order to recycle the waste materials.

To achieve the first object of the present invention, a ceramic composition comprises between about 5 and about 75 by weight part of a solid state waste material including heavy metals, between about 15 and about 45 by weight part of a fly ash and between about 5 and about 55 by weight part of a clay.

The solid state waste material is at least one selected from the group consisting of an electric arc furnace dust, a steel slag and a paper ash. Preferably, the ceramic composition further comprises between about 5 and about 15 by weight part of an aluminum dross.

According to one embodiment of the present invention, a ceramic composition comprises between about 5 and about 55 by weight part of an electric arc furnace dust, between about 15 and about 45 by weight part of a fly ash and between about 15 and about 55 by weight part of a clay. Preferably, the ceramic composition further comprises between about 5 and about 15 by weight part of a paper ash and the ceramic composition additionally comprises between about 5 and about 15 by weight part of an aluminum dross.

According to another embodiment of the present invention, a ceramic composition comprises between about 25 and about 40 by weight part of a fly ash, between about 15 and about 55 by weight part of a paper ash and between about 15 and about 50 by weight part of a clay.

According to other embodiment of the present invention, a ceramic composition comprises between about 15 and about 55 by weight part of a steel slag, between about 15 and about 45 by weight part of a fly ash, and between about 5 and about 45 by weight part of a clay. Preferably, the ceramic composition further comprises between about 15 and about 35 by weight part of an electric arc furnace dust or between about 15 and about 35 weight part of a paper ash.

Also, to achieve the second object of the present invention, a method for manufacturing a ceramic composition made from waste materials comprises the steps of:

a) forming a homogeneous slip by mixing a ceramic composition with a water wherein the ceramic composition comprises between about 5 and about 75 by weight part of a solid state waste material including heavy metals, between about 15 and about 45 by weight part of a fly ash and between about 5 and about 55 by weight part of a clay;

b) forming a shaped body having a predetermined shape by using said slip;

c) drying said shaped body; and d) forming a sintered body by sintering said shaped body.

The step a) is performed after analyzing chemical constitutions of ingredients of the ceramic composition and measuring particle size distributions of the ingredients of the ceramic composition.

Preferably, the step a) is performed by primarily mixing an ingredient of said ceramic composition with a water considering volume ratios of particles having diameters of below about 10 $\mu$m wherein the ingredient includes a volume ratio of the particles of 10 $\mu$m which is larger than other ingredients of the ceramic composition and by mixing the ingredients with a water in the order of included particle sizes. More preferably, the step b) is performed by an extrusion method, an injection molding method or a pressing method.

According to one embodiment of the present invention the step a) further comprises sieving and milling the slip for homogeneously maintaining agglomerates in the slip and the milling is preferably performed by using a ball mill for about 1 to about 5 hours.

The step c) is performed in a furnace at a temperature of about 40 to 60° C. for a time of above 24 hours and the step d) is performed at a temperature of between about 900° C. and about 1300° C. for about 1to about 3 hours.

The ceramic composition of the present invention can be available for building or light construction materials such as a block, a tile or a retaining wall and be applied for a ceramic ware such as a porcelain or a sanitary arrangement. Also, the ceramic composition can be used for an engineering material such as a filter or a mechanical part.

As it is described above, the recycling method of waste materials is restrictedly available for cements though the treating method of the hazardous metals is partially developed centering around the recovery of the heavy metals from the waste materials or inhibiting the eruption of the heavy metals from the waste materials. That is, the recycling of the waste materials is restricted since several methods disclosed in the above patents do not simultaneously settle all the problems demanded for ceramic products such as the special characteristic, the mechanical strength and the lower manufacturing cost. Thus, it has not developed the ceramic composition having high mechanical strength and homogeneous characteristics by using the waste materials because the homogeneous mixture or the slip is hardly obtained when various waste materials having different chemical constitutions and characteristics are simultaneously treated.

Therefore, the present inventors have developed a method for forming a homogeneous and stable slip by mixing the waste materials considering the combinations, the average particle size distributions and the mixing order of the ingredients of the ceramic composition. The sintered bodies made from the stable slip have excellent mechanical strengths and beautiful appearances according to the present invention.

Since the heavy metals do not erupt from the sintered body in order to recycle the waste materials, the restraining mechanism for heavy metal eruption of the present invention will be described as follows.

During the heat treating the heavy metals and the metal oxides, an oxidation reaction of hazardous metals occurs and a eutectic reaction between the metal oxides also occurs. For example, the eutectic temperature of lead oxide (PbO) and silica ($SiO_2$) is about 700° C. and the liquid phase of the eutectic composition of PbO and $SiO_2$ is formed above the eutectic temperature. When the eutectic reactions occur between various metals and metal oxides, the hazardous metals are fused into liquid phases of eutectic reactants, so the hazardous metals of the waste materials are stabilized. At the same time, the eutectic liquid phases and the fly ash together form retiary structure to accelerate the sintering of the shaped body of the waste materials. Therefore, the sintering process is performed at a relative temperature of between about 900° C. and about 1200° C. The hazardous metals are not exuded from the sintered body and the sintered body has a sufficient strength for the construction material or the engineering material.

In the meantime, the conventional ceramic products are generally manufactured by a ceramic composition consisting of a clay, a feldspar and a silica. The clay allows the mixture of the ceramic composition to have a plasticity and the feldspar forms a liquid phase during a sintering step. The silica forms a retiary structure to prevent a sintered body from softening during the sintering step.

According to the present invention, the waste materials include various metals and metal oxides as described above. Among the waste materials, solid state waste material such as the EAF dust, the steel slag or the paper ash forms a liquid phase during the sintering process, so the solid state waste material plays the part of the feldspar in the conventional ceramic composition. The solid state waste material contains heavy metals, in particular alkali metals and alkaline earth metals. The fly ash essentially consists of the silica and the alumina likewise the clay, however, the crystalline structure of the fly ash comprises the mullite and the cristobalite which are different from the alumina-silicate structure of the clay when the sintering process is performed at a temperature of above 1000° C. Since the fly ash has characteristics quite different from the alumina-silicate structure, the fly ash has a little plasticity but has a high refractoriness though the chemical constitution of the fly ash is similar to the clay. Thus, the fly ash forms the retiary structure so that prevents the softening of the sintered body and increases the mechanical strength of the sintered body. That is, the fly ash plays the part of the silica in the conventional ceramic composition.

As it is described above, the feldspar-clay-silica system of the conventional ceramic composition can be substituted by the $RO/R_2O$-clay-F/A system according to the present invention, so the ceramic composition of the present invention is manufactured on the basis of that fact. For manufacturing a ceramic product having a high mechanical strength by using the ceramic composition of the present invention, a combination of the ceramic composition having a proper $RO/R_2O$-clay-F/A system is demanded through analyzing the chemical constitution and the crystalline structure of the ceramic composition. Though ceramic compositions are prepared from the same combinations of $RO/R_2O$-clay-F/A, the sintered bodies respectively show different mechanical strengths and bulk specific gravities. Also, proper sintering time and temperature should be determined for each ceramic composition.

In the present invention, characteristics of the sintered body are determined by ceramic composition, mixing procedure, sintering temperature and sintering time. The sintered body meets the standard of heavy metal eruption tests, for example, toxic characteristic leaching procedure (TCLP) of the U.S. environment protection agency (EPA).

Table 1 shows the average weight percents of chemical elements contained in the ingredients of the ceramic composition according to the present invention.

TABLE 1

| element | EAF dust (wt %) | fly ash (wt %) | paper ash (wt %) | Al dross (wt %) | clay (wt %) |
|---|---|---|---|---|---|
| $SiO_2$ | 5.6 | 65.87 | 42.83 | 1.1 | 61.67 |
| $Al_2O_3$ | 1.02 | 23.3 | 28.07 | 86.04 (total*) | 22.74 |
| $Fe_2O_3$ | 49.42 (total*) | 3.21 | 0.75 | 1.23 | 3.49 |
| CaO | 6.0 | 1.0 | 13.9 | — | 0.61 |
| MgO | 1.57 | 0.7 | 6.3 | 1.93 | 0.48 |
| $Na_2O$ | 0.12 | 0.24 | 0.48 | — | 0.42 |
| $K_2O$ | 2.57 | 1.01 | 0.3 | — | 1.57 |
| $TiO_2$ | 0.09 | 1.11 | 2.31 | 0.85 | 0.29 |
| $P_2O_5$ | 0.23 | 0.24 | 0.43 | — | 0.05 |
| $Cr_2O_3$ | 0.22 | — | — | 0.16 | — |
| MnO | 1.97 | — | — | 0.26 | — |
| PbO | 2.0 | — | — | 0.13 | — |
| ZnO | 14.5 | — | — | 0.44 | — |
| Cu | — | — | — | 0.36 | — |
| Ni | — | — | — | 0.045 | — |
| C | — | — | — | 0.7 | — |
| Ig-loss | 14.69 | 3.32 | 4.63 | 6.755 | 8.68 |

In the table 1, the total* means the total amount of metal and metal oxide. Namely, $Al_2O_3$ represents the total amount of Al and $Al_2O_3$ and $Fe_2O_3$ represents the total amount of Fe, FeO and $Fe_2O_3$. The Ig-loss means decreased amounts due to volatile elements such as a water of crystallization, a hydroxide and a carbon dioxide during a heat treating process at a temperature of about 900 to 1000C. before analyzing the elements.

BRIEF DESCRIPTION OF THE DRAWINGS

The above objects and advantages of the present invention will become more apparent by describing in detail the preferred examples thereof with reference to the attached drawings, in which.

DETAILED DESCRIPTION OF THE INVENTION

Hereinafter, the preferred examples of the present invention will be explained in more detail with reference to the accompanying drawings.

In the present invention, a ceramic composition and a method for manufacturing the ceramic composition will be described as follows.

Figure 1:
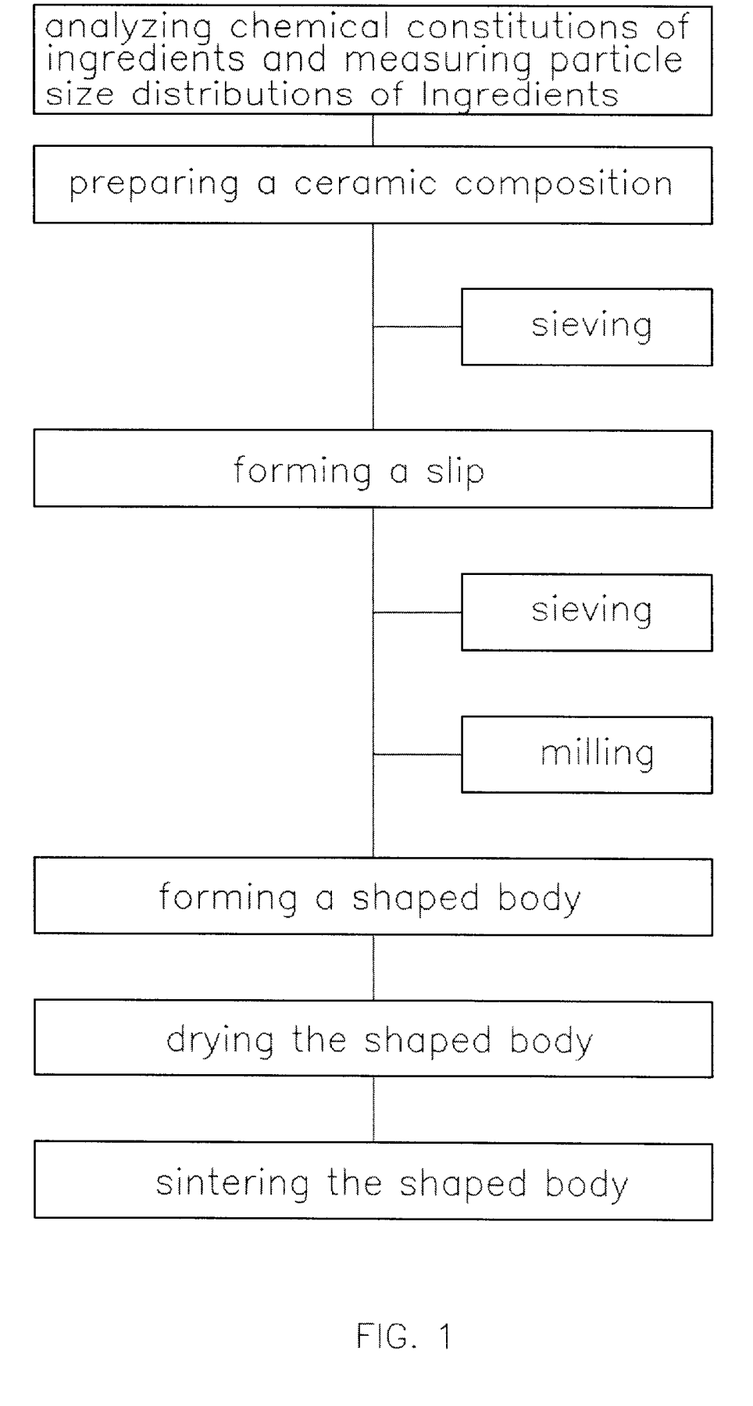
FIG. 1 is a block diagram for illustrating a process for manufacturing a ceramic composition according to the present invention.

FIG. 1 is a schematic block diagram for illustrating the process for manufacturing the ceramic composition according to the present invention.

Referring to FIG. 1, ingredients of the ceramic composition are divided into a first group of $RO/R_2O$ (wherein R represents alkali metals or alkaline earth metals) and a second group of F/A (fly ash) after analyzing the chemical elements of the ingredients of the ceramic composition and measuring the particle distribution of the ingredients. The first group comprises an electric arc furnace (EAF) dust, a steel slag, a paper ash, an aluminum (Al) dross and so on.

Subsequently, the combination composed of $RO/R_2O$-F/A-clay is prepared after one ingredient is selected from the first group. At that time, the ingredients include various metals and metal oxides. Namely, the elements of RO and $R_2O$ are contained in the EAF dust, the paper ash and the steel slag. The RO or the $R_2O$ form a liquid phase during a sintering process, so they function as a feldspar utilized in the conventional ceramic process.

The main elements of the fly ash are silica ($SiO_2$) and alumina ($Al_2O_3$) in the same elements of the clay, however, the main crystalline structures of the fly ash are a mullite and a cristobalite which are different from the crystalline structure of alumina-silicate of the clay. Because of the crystalline structure, the fly ash does not have plasticity but the fly ash has high refractoriness and the fly ash forms retiary structures during the sintering process, so the fly ash prevents the softening of a sintered body to increase the strength of the sintered body. Therefore, the proper combination of $RO/R_2O$-F/A-clay is demanded through the analyzing the chemical elements and the crystalline structure of the ingredients for manufacturing the ceramic composition having high strength. The RO and $R_2O$ are much included in the EAF dust, the steel slag and the paper ash. The Al dross and the fly ash together form the retiary structure during the sintering process since the Al dross mainly contains the alumina. In the present invention, the clay is added so as to increase the plasticity of the ceramic composition, however, the clay is not a necessary ingredient.

The stable slip is prepared by homogeneously mixing the selected ingredients and the clay. In this process, homogeneous agglomerates should be formed for making the stable slip, so the mixing procedure of the ingredients becomes greatly important. Considering the average particle sizes of the ingredient and the volume ratios of the particles having diameters of below about 10 μm, one ingredient having a volume ratio of the particles of below 10 μm which is larger than other ingredient is primarily mixed with sufficient water and the other ingredients are mixed in order of the particle size. That is, the ingredient having small particles is primarily mixed with sufficient water so as to obtain agglomerates having homogeneous sizes during forming the slip.

When the ingredient includes large sized particles and has a wide particle size distribution, small particles of the ingredient are added first and large particles secondarily added in order to prevent the sizes of agglomerates from increasing after the particles are divided through a sieving process. It is preferably to use a minute sieve for forming the agglomerates having homogeneous sizes. However, a sieve of about 80 meshes can be effectively used.

Though the sieving process is performed for the ingredient having large particles, a milling process is additionally demanded to maintain the agglomerates having homogeneous sizes. A sintered body has a homogeneous and minute structure by maintaining the agglomerates having minute and homogeneous sizes. Also, the sintered body has high strength by using those agglomerates.

A shaped body having a predetermined shape, for example a rectangular hexahedron or a cubic, is formed by using the slip and by an extrusion method, an injection molding method or a pressing method. The shaped body is preferably manufactured by the extrusion method. Furthermore, the shaped body is formed by an isostatic method after the slip has granular shape by a spray drying method.

Subsequently, the shaped body is dried at a temperature of between about 40° C. and about 60° C. after the shaped body is inserted into a box furnace by maintaining a constant humidity. The shaped body is sufficiently dried for above 24 hours, and then the shaped body is sintered in the box furnace or a kiln at a temperature of between about 1000° C. and about 1200° C. for about 1to 3 hours. In the sintering process, sintered bodies respectively have different mechanical strengths and bulk specific gravities according to the sintering temperature and the sintering time though sintered bodies are produced by using the same ceramic compositions having the same combinations of $RO/R_2O$-F/A-clay. Therefore, the proper sintering conditions must be determined in order to obtain the sintered body having desired characteristics such as a mechanical strength and a bulk specific gravity.

According to the present invention, the ceramic composition can be used for various construction materials, building materials and engineering materials.

Hereinafter, the present invention will be particularly shown and described with reference to particular examples thereof, it will be understood by those skilled in the art that various changes in form and detail may be effected therein without departing from the spirit and scope of the invention.

EXAMPLE 1

For manufacturing a ceramic composition, particle distributions of an electric arc furnace (EAF) dust, a fly ash and a clay were measured after their chemical elements were analyzed as shown in the table 1. The EAF dust included heavy metals and heavy metal oxides such as $RO/R_2O$ (wherein R represents alkali metals or alkaline earth metals). The heavy metals and the heavy metal oxides may be included in the fly ash. In the present example, the ceramic composition comprised the EAF dust, the fly ash and the clay.

Figure 2:
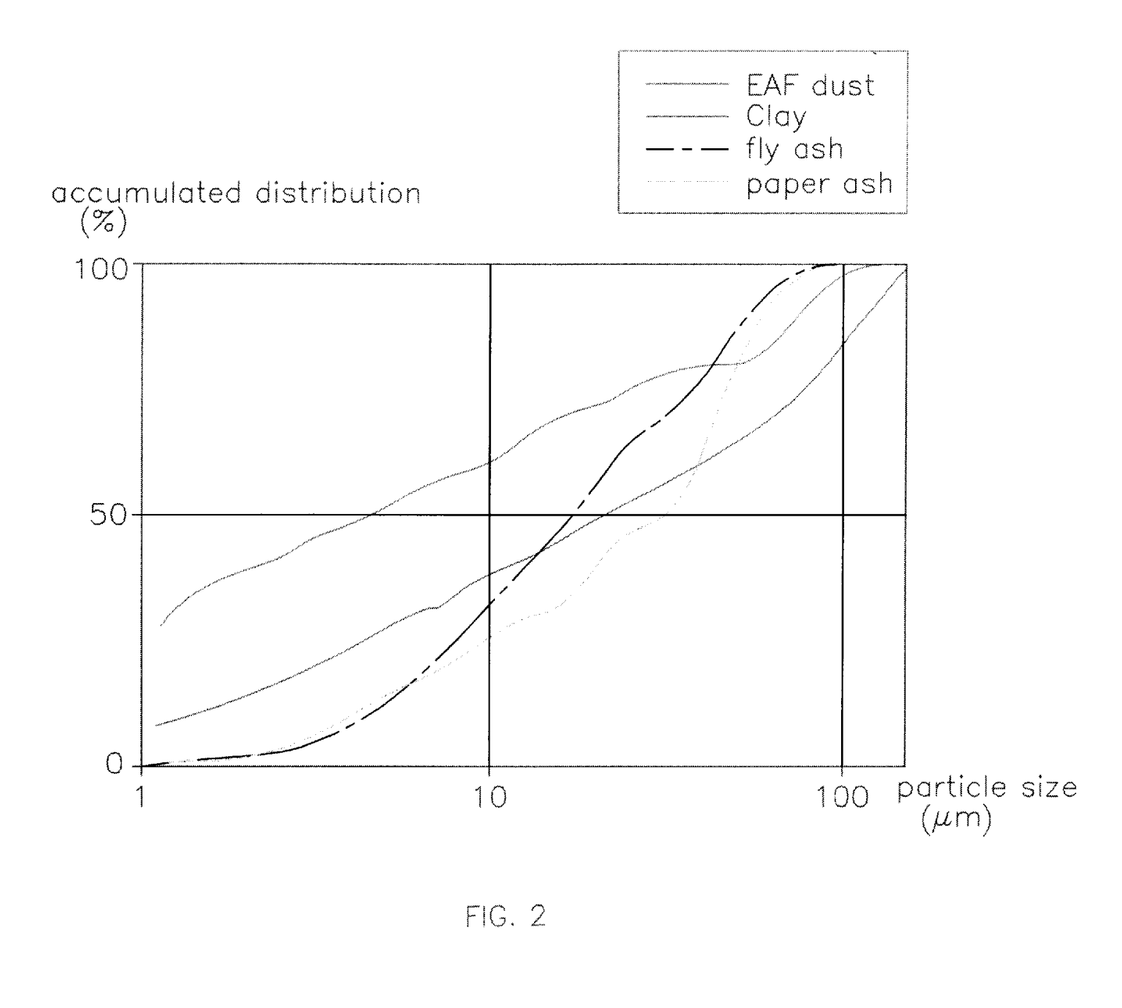
FIG. 2 is an accumulated particle size distributions graph for showing particle sizes of an EAF dust, a fly ash, a clay and a paper ash according to the present invention.

FIG. 2 is an accumulated particle size distribution graph for showing the particle sizes of the EAF dust, the fly ash and the clay. Referring to FIG. 2, the number of minute particles having a diameter of below 10 $\mu$m in the EAF dust is greater than those of the fly ash and the clay. Also, the number of minute particles of the clay is greater than the fly ash.

The EAF dust, the fly ash and the clay are homogeneously mixed to form the ceramic composition according to the present example. The ceramic composition comprised 10 by weight part of the EAF dust, 40 by weight part of the fly ash and 50 by weight part of the clay. In this case, the mixing procedure was executed on the basis of the particle size distributions as shown in FIG. 2 in order to form a homogeneous and stable slip as follows.

At first, the EAF dust was mixed with sufficient water and then the clay was mixed with the EAF dust and the water. Subsequently, the fly ash was added to form the slip. At that time, it is important to form homogeneous agglomerates consisted of the EAF dust, the clay, the fly ash and the sufficient water in order to make the homogeneous slip, so the mixing procedure is very important during forming the slip.

Then, the shaped body was inserted into a box furnace after the shaped body having a predetermined shape was manufactured by using the slip and by an extrusion method, an injection molding method or a pressing method. Preferably, the shaped body was manufactured by the extrusion method.

The shaped body was dried in the box furnace at a temperature of about 50° C. The shaped body was sufficiently dried for above 24 hours.

Subsequently, a sintered body was manufactured by sintering the shaped body in the box furnace at a temperature of about 1200° C. for about 2 hours.

Table 2 shows the heavy metal eruption test of the sintered body made from the ceramic composition including the EAF dust according to the present example. The criterion of the table 2is maximum permissible eruption limits suggested by the toxic characteristic leaching procedure (TCLP) of the U.S. environment protection agency (EPA). The eruption amounts of the heavy metals from the sintered body were measured by the units of p.p.m.

TABLE 2

| heavy metal | chrome (Cr) | iron (Fe) | zinc (Zn) | copper (Cu) | arsenic (As) | manganese (Mn) |
|---|---|---|---|---|---|---|
| maximum permissible eruption limit | 0.5 | 2.0 | 1.0 | 0.5 | 0.1 | 2.0 |
| Example 1 | 0.18 | 0.13 | 0.1 | 0.0 | 0.038 | 0.04 |
| Example 2 | 0.12 | 0.08 | 0.07 | 0.0 | 0.034 | 0.02 |
| Example 3 | 0.02 | 0.05 | 0.03 | 0.0 | 0.022 | 0.0 |

Referring to table 2, the eruption amounts of the heavy metals from the sintered body of the present example are greatly below the permissible eruption limits. Namely, the sintered body of the present example sufficiently meets the standard of the TCLP of the USEPA.

A sample block was manufactured by using the ceramic composition of the present example in order to estimate suitability of the sample block as a building material and an engineering material. The sample block of the present example had a rectangular hexahedral shape having a dimension of 30 cm×30 cm×60 cm. That is, the sample block was 30 cm in width, 30 cm in length and 60 cm in height. The bulk specific gravity and the compressive strength of the sample block were measured and the result was stated in table 3.

TABLE 3

| property | bulk specific gravity (g/cm$^3$) | compressive strength (psi) |
|---|---|---|
| Example 1 | 1.74 | 7,827 |
| Example 2 | 1.82 | 8,821 |
| Example 3 | 2.07 | 14,524 |

As shown in the table 3, the sample block of the present example has a compressive strength of about 7,827 psi which is greater than the standard compressive strength of 1,500 psi suggested by the ASTM C62. Therefore, the sample block is sufficiently used for a building material or an engineering material. Also, the sample block of the present example has an excellent bulk specific gravity of about 1.74 g/cm$^3$ which is much lower than the ordinary block having a bulk specific gravity of above 2.5 g/cm$^3$, so the sample block has an excellent characteristic when it is used for a light construction material, the building material and the engineering material.

EXAMPLE 2

An EAF dust, a fly ash and a clay were homogeneously mixed with sufficient water in order to manufacture a ceramic composition of the present example after the particle size distributions of the ingredients were measured. The ceramic composition of the present example comprised 20 by weight part of the EAF dust, 40 by weight part of the fly ash and 40 by weight part of the clay. In the present example, the manufacturing steps including the mixing procedure were the same as those of the example 1 except a sintering step. The sintering process of the present example was performed at a temperature of about 1150° C.

As shown in the table 2, the heavy metal eruption test of the sintered body made from the ceramic composition was executed according to the present example. Referring to the table 2, the eruption amounts of the heavy metals from the sintered body of the present example are greatly below the permissible eruption limits. That is, the sintered body of the present example sufficiently meets the standard of the TCLP of the USEPA.

Then, a sample block was manufactured by using the ceramic composition of the present example in order to estimate suitability of the sample block as a building material and an engineering material. The sample block of the present example had a rectangular hexahedral shape having a dimension of 30cm×30cm×60cm. The bulk specific gravity and the compressive strength of the sample block were measured and the result was stated in the table 3.

Referring to the table 3, the sample block of the present example has a compressive strength of about 8,821 psi which is greater than the standard compressive strength of 1,500 psi suggested by the ASTM C62. Therefore, the sample block of the present example is sufficiently used for the building material or the engineering material. Also, the sample block of the present example has a bulk specific gravity of about 1.82 g/cm$^3$ which is much lower than the ordinary block having a bulk specific gravity of above 2.5 g/cm$^3$, so the sample block has an excellent characteristic when it is used as the light construction material, the building material and the engineering material.

EXAMPLE 3

In order to manufacture a ceramic composition made from waste materials, an EAF dust, a fly ash and a clay were homogeneously mixed with sufficient water according to the present example after the particle size distributions of the ingredients of the ceramic composition were measured. The ceramic composition of the present example comprised 30 by weight part of the EAF dust, 40 by weight part of the fly ash and 30 by weight part of the clay. In the present example, the manufacturing steps including the mixing procedure were the same as those of the example 2.

As shown in the table 2, the heavy metal eruption test of the sintered body made from the ceramic composition was executed according to the present example. Referring to the table 2, the eruption amounts of the heavy metals from the sintered body of the present example are greatly below the permissible eruption limits. That is, the sintered body of the present example sufficiently meets the standard of the TCLP of the USEPA.

Then, a sample block was manufactured by using the ceramic composition of the present example in order to estimate suitability of the sample block as a building material and an engineering material. The sample block of the present example had a rectangular hexahedral shape having a dimension of 30 cm×30 cm×60 cm. The bulk specific gravity and the compressive strength of the sample block were measured and the result was stated in the table 3.

Referring to the table 3, the sample block of the present example has a compressive strength of about 14,524 psi which is much greater than the standard compressive strength of 1,500 psi suggested by the ASTM C62. Hence, the sample block of the present example is sufficiently used as the building material or the engineering material. Also, the sample block of the present example has a bulk specific gravity of about 2.07 g/cm$^3$ which is lower than the ordinary block having a bulk specific gravity of above 2.5 g/cm$^3$, so the sample block has an excellent characteristic when it is used as the light construction material, the building material and the engineering material.

EXAMPLE 4

A ceramic composition was obtained by mixing an EAF dust, a fly ash and a clay with sufficient water after analyzing the chemical elements and measuring the particle distributions of the ingredients of a ceramic composition consisted of the EAF dust, the fly ash and the clay. The ceramic composition of the present example comprised 40 by weight part of the EAF dust, 30 by weight part of the fly ash and 30 by weight part of the clay. The EAF dust contains heavy metals and heavy metal oxides.

In the present example, sintered bodies were respectively obtained by sintering shaped bodies in a box furnace at temperatures of about 1150° C. and about 1200° C. for about 2 hours after the shaped bodies were formed and dried by using the ceramic composition. That is, each sintered body was respectively sintered at different temperatures. A sieving process was executed for the body which was sintered at a temperature of about 1200° C. The sieving process was performed with a sieve of 200 meshes. Table 4 shows the bulk specific gravity of the sintered bodies according to the sintering temperature.

TABLE 4

| sintering temperature | 1150° C. | 1200° C. | 1200° C. |
|---|---|---|---|
| sieving process | — | — | 200 meshes |
| bulk specific gravity | 2.68 g/cm$^3$ | 2.02 g/cm$^3$ | 2.85 g/cm$^3$ |

As shown in the table 4, the bulk specific gravity of the sintered body was decreased according as the sintering temperature was increased from 1150° C. to 1200° C. because the volatile elements were captured in the sintered body when the sintering temperature was increased. In the case of the present example, the EAF dust, the clay and the fly ash were mixed in order with water so as to form a slip. When the agglomerates relatively having large sizes were removed by sieving the slip with the sieve of 200 meshes, the sintered body produced by using this slip had a large bulk specific gravity. Thus, the dense shaped body and the dense sintered body could be obtained when the agglomerates in the slip had relatively small sizes. That is, the density of the sintered body could be controlled by adjusting the sintering temperature and the particle size.

Table 5 shows the result of the heavy metal eruption test by using the sintered bodies of the present example. In the table 5, the average erupted amounts of the heavy metals from the sintered bodies were measured by the unit of p.p.m. Referring to table 5, the heavy metals were hardly erupted from the sintered body of the present example. In particular, zinc and manganese were not erupted from the sintered body of the present example.

TABLE 5

| heavy metal | chrome (Cr) | iron (Fe) | zinc (Zn) | copper (Cu) | arsenic (As) | manganese (Mn) |
|---|---|---|---|---|---|---|
| permissible limit | 0.5 | 2.0 | 1.0 | 0.5 | 0.1 | 2.0 |
| measured value | 0.02 | 0.04 | 0.02 | 0.0 | 0.015 | 0.0 |

After sample blocks were made by using the ceramic composition of the present example through the forming, the drying and the sintering processes, the compressive strengths of the sample blocks were measured so as to estimate the suitability of the sample block for building material and engineering material. In the present example, the six sample blocks were respectively sintered at 1200° C. Three sample blocks had regularly hexahedral (cubic) shapes and the other sample blocks had rectangular hexahedral shapes. Each cubic sample block had a dimension of 30 cm in width, 30 cm in length and 30 cm in height. Each rectangular hexahedral sample block had a dimension of 30 cm in width, 30 cm in length and 60 cm in height. Table 6 shows the compressive strengths of the sample blocks having those shapes.

TABLE 6

| shape of the sample | compressive strength of regular hexahedron (cube) | compressive strength of rectangular hexahedron |
|---|---|---|
| sample 1 | 16,484 psi | 19,993 psi |
| sample 2 | 14,537 psi | 28,221 psi |
| sample 3 | 16,199 psi | 21,500 psi |
| average | 15,740 psi | 23,238 psi |

As shown in the table 6, the average compressive strength of the cubic blocks was about 15,740 psi and the average compressive strength of the rectangular hexahedral blocks was about 23,238 psi, so the blocks of the present example can be sufficiently applied for the building material and the engineering material since the blocks of the present example have good compressive strengths greater than the standard of 1,500 psi according to the ASTM C62.

EXAMPLE 5

An EAF dust, a fly ash and a clay were mixed with sufficient water to form a ceramic composition after the analyzing and the measuring steps as described above. The ceramic composition of the present example comprised 50 by weight part of the EAF dust, 30 by weight part of the fly ash and 20 by weight part of the clay. In the present example, the mixing order of the ingredients of the ceramic composition was identical to that of the example 1 and other manufacturing processes were the same as those of the example 1 except the sintering temperature. The sintered body of the present example was obtained at a relative low temperature of about 1000° C.

Table 7 shows the results of the heavy metal eruption test by using several sintered bodies of the present invention. In the table 7, the erupted amounts of the heavy metals from the sintered bodies were measured by the unit of p.p.m. Referring to table 7, the heavy metals were hardly erupted from the sintered body of the present example, in particular copper and manganese were not erupted from the sintered body of the present example. Hence, the sintered body of the present example sufficiently meets the permissible limits of the USEPA.

TABLE 7

| heavy metal | chrome | iron | zinc | copper | arsenic | manganese |
|---|---|---|---|---|---|---|
| permissible limit | 0.5 | 2.0 | 1.0 | 0.5 | 0.1 | 2.0 |
| Example 5 | 0.01 | 0.04 | 0.02 | 0.0 | 0.014 | 0.0 |
| Example 6 | 0.01 | 0.04 | 0.02 | 0.0 | 0.014 | 0.0 |
| Example 7 | 0.01 | 0.03 | 0.02 | 0.0 | 0.013 | 0.0 |
| Example 8 | 0.06 | 0.07 | 0.05 | 0.042 | 0.02 | 0.0 |

The sample block was manufactured by using the ceramic composition of the present example through the sintering process at a temperature of about 1000° C. The sample block had a rectangular hexahedral shape having a dimension of 30 cm×30 cm×60 cm. That is, the sample block was 30cm in width, 30 cm in length and 60 cm in height. The bulk specific gravities and the compressive strengths of some sample blocks are shown in table 8.

TABLE 8

| property | bulk specific gravity (g/cm$^3$) | compressive strength (psi) |
|---|---|---|
| Example 5 | 2.11 | 16,038 |
| Example 6 | 2.20 | 20,212 |
| Example 7 | 2.34 | 25,095 |
| Example 8 | 1.34 | 4,527 |

Referring to the table 8, the sample block of the present example is sufficiently suitable to the building material since the sample block of the present example has a high compressive strength of about 16,038 psi and a low bulk specific gravity of about 2.11.

EXAMPLE 6

In order to manufacture a ceramic composition comprising an EAF dust, a paper ash (the remaining ash after burning the paper fragment slurry produced by paper manufacturing) and a fly ash, the particle size distributions of the ingredients were measured as shown in FIG. 2. Referring to FIG. 2, the number of minute particles having diameters of below 10 μm in the EAF dust was larger than those of the fly ash and the paper ash. The numbers of minute particles were substantially equal to each other, however, the paper ash included large particles more than the fly ash.

The ceramic composition of the present example comprised 50 by weight part of the EAF dust, 20 by weight part of the paper ash and 30 by weight part of the fly ash. The ingredients of the ceramic composition were homogeneously mixed with sufficient water so as to form a stable slip. In this case, the order for mixing the ingredients was described as follows.

The EAF dust was primarily mixed with water since the EAF dust contained the most minute particles therein. Subsequently, the fly ash and the paper ash were added in order. In the present example, that mixing order is very important because the ingredients form homogeneous agglomerates in order to make the stable slip.

Since the paper ash has a wide particle size distribution as shown in FIG. 2, the minute particles of the paper ash were mixed first and the large particles were secondarily mixed after sieving the paper ash with a sieve having a dimension of 200 meshes. If the slip was manufactured without sieving the paper ash which had the wide particle size distribution, the homogeneous slip was not obtained because the precipitation of the large particles occurred. However, the homogeneous and stable slip was obtained without the precipitation when the small particles and the large particles were added in order through the sieving process.

The shaped body of the present example was formed and dried by the same processes of the example 1, and then the sintered body was obtained by sintering the shaped body at a temperature of about 1000° C. for about 2 hours.

The result of the eruption test of the present example was disclosed in the table 7. The sintered body of the present invention meets the criterion of the USEPA as shown in the table 7.

Also, the sample block was manufactured by using the ceramic composition through the above described manufacturing process. In the present example, the shape and the dimension of the block were identical to the lock of the example 5. Referring to the table 8, the sample block of the present example has a good compressive strength of about 20,212 psi and a low bulk specific gravity of about 2.20 g/cm$^3$, so the sample block is estimated as light construction material.

EXAMPLE 7

An EAF dust, a clay, a fly ash and a paper ash were mixed with sufficient water to form a ceramic composition after the analyzing and the measuring steps as described above. The ceramic composition of the present example comprised 50 by weight part of the EAF dust, 10 by weight part of the paper ash, 20 by weight part of the fly ash and 20 by weight part of the clay. In the present example, the mixing order of the ingredients of the ceramic composition was identical to those of the examples 1 and 6 and other manufacturing processes were the same as those of the example 1 except the sintering temperature. The sintered body of the present example was obtained at a temperature of about 1000° C.

Table 7 shows the results of the heavy metal eruption test by using the sintered body of the present example. Referring to the table 7, the heavy metals were hardly erupted from the sintered body of the present example, in particular copper and manganese were not erupted from the sintered body of the present example. Therefore, the sintered body of the present example sufficiently meets the permissible limits of the USEPA.

The sample block was manufactured by using the ceramic composition through the above described manufacturing process. In the present example, the shape and the dimension of the block were identical to the lock of the example 5. Referring to the table 8, the sample block of the present example has an excellent compressive strength of about 25,095 psi and a relative low bulk specific gravity of about 2.34 g/cm$^3$, so the sample block is estimated as building martial or light construction material.

EXAMPLE 8

For manufacturing a ceramic composition made from waste materials, an EAF dust, a clay, a fly ash, a paper ash and an aluminum (Al) dross were mixed in order with sufficient water to form a homogeneous and stable slip. The ceramic composition of the present example comprised 25 by weight part of the EAF dust, 20 by weight part of the clay, 40 by weight part of the fly ash, 5 by weight part of the paper ash and 10 by weight part of the Al dross.

In the case of the present example, the sieving processes were respectively performed for the paper ash and the Al dross because the Al dross contained many large sized particles such as the paper ash. The successive manufacturing steps were the same as those of the example 1 except the sintering step was executed at a temperature of about 1150° C.

The table 7 shows the results of the heavy metal eruption test by using the sintered body according to the present example. Referring to the table 7, the heavy metals were hardly erupted from the sintered body of the present example, so the sintered body of the present example sufficiently meets the permissible limits of the USEPA.

The sample block was manufactured by using the ceramic composition through the above described manufacturing process. In the present example, the shape and the dimension of the block were identical to the lock of the example 5. Referring to the table 8, the sample block of the present example has a relative low compressive strength of about 4,527 psi and an excellent bulk specific gravity of about 1.34 g/cm3. However, the sample block is sufficiently used as building material, in particular, light construction material.

EXAMPLE 9

According to the present example, a ceramic composition was manufactured by mixing a paper ash and a fly ash, so the heavy metal eruption test was not demanded. The ceramic composition of the present example comprised 70 by weight part of the paper ash and 30 by weight part of the fly ash. In this case, the fly ash was primarily mixed with water and the paper ash was secondly added after a sieving step of the paper ash.

Because the weight part of the paper ash including large sized particles was high, the ceramic composition was sufficiently grinded by using a ball mill for about 4 hours for forming a homogeneous and stable slip. The other manufacturing steps were identical to the example 1 except the sintering process was performed at 1150° C.

Table 9 shows the color, the bulk specific gravity and the compressive strength of the sample block manufactured by using the ceramic composition according to the present example.

The dimension of the sample was identical to the block of the example 5.

TABLE 9

| property | bulk specific gravity | compressive strength | color of the sample block |
| --- | --- | --- | --- |
| Example 9 | 1.80 g/cm$^3$ | 6,267 psi | ivory |
| Example 10 | 2.02 g/cm$^3$ | 13,230 psi | light brown |
| Example 11 | 2.34 g/cm$^3$ | 23,333 psi | brown |
| Example 12 | 2.23 g/cm$^3$ | 22,907 psi | gray brown |

Referring to the table 9, the sample block of the present example has a compressive strength of about 6,267 psi which is lager than the standard strength of 1,500 psi recommended by the ASTM C62. Hence, the sample block is suitable to the building material. In particular, the sample block of the present example has an excellent bulk specific gravity and a beautiful appearance, so it can be used as a good light construction material or a ceramic ware such as a tile or a porcelain.

EXAMPLE 10

A clay, a fly ash and a paper ash were mixed in order with sufficient water for manufacturing a ceramic composition according to the present example. The ceramic composition of the present example comprised 50 by weight part of the paper ash, 30 by weight part of the fly ash and 20 by weight part of the clay. In the present example, the heavy metal eruption tests were not executed.

In the present example, the ceramic composition was sufficiently grinded by using a ball mill for about 4 hours in order to form a homogeneous slip because the weight part of the paper ash including large sized particles was relatively high. The successive manufacturing steps were identical to the example 9.

In the table 9, the color, the bulk specific gravity and the compressive strength of the sample block of the present example are stated. The sample block was manufactured by using the ceramic composition according to the present example and the dimension of the sample was identical to the block of the example 5. The sample block of the present example has a bulk specific gravity of about 2.02 $g/cm^3$ which is lower than that of the ordinary building block. Also, the sample block has a good compressive strength of about 13,230 psi and a beautiful appearance. Therefore, the sample block can be variously used as a building material, a light construction material or a ceramic ware.

When the sample block is manufactured by using the ceramic composition having the paper ash, the fly ash and the clay, the sample block has an excellent appearance of various colors according to relative amounts of the ingredients of the ceramic composition.

EXAMPLE 11

A clay, a fly ash and a paper ash were homogeneously mixed in order with sufficient water so as to manufacture a ceramic composition according to the present example. The ceramic composition of the present example comprised 40 by weight part of the paper ash, 35 by weight part of the fly ash and 25 by weight part of the clay. The mixture was grinded by using a ball mill for about 3 hours to form a stable slip. The successive manufacturing steps were the same as those of the example 9.

In the table 9, the color, the bulk specific gravity and the compressive strength of the sample block are stated and the sample block was manufactured by using the ceramic composition according to the present example. The dimension of the sample block of the present example was identical to the block of the example 5.

The sample block of the present example has a bulk specific gravity of about 2.34 $g/cm^3$ which is lower than that of the ordinary building block and the sample block has an excellent compressive strength of about 23,333 psi. Thus, the sample block can be variously used as a building material, a light construction material or a ceramic ware.

EXAMPLE 12

For manufacturing a ceramic composition made from waste materials, a clay, a fly ash and a paper ash were mixed in order with sufficient water according to the present example. The ceramic composition of the present example comprised 20 by weight part of the paper ash, 35 by weight part of the fly ash and 45 by weight part of the clay. The mixture of the ceramic composition was grinded by using a ball mill for about 2 hours so as to form a stable and homogeneous slip. The successive manufacturing steps were the same as those of the example 9.

As shown in the table 9, the color, the bulk specific gravity and the compressive strength of the sample block are mentioned and the sample block was manufactured by using the ceramic composition according to the present example. The color, the bulk specific gravity and the compressive strength of the sample block manufactured the ceramic composition of the present example as shown in the table 9. The dimension of the sample block of the present example was identical to the block of the example 5. The sample block of the present example has a bulk specific gravity of about 2.23 $g/cm^3$ and an excellent compressive strength of about 22,907 psi. Hence, the sample block of the present example can be variously used as a building material, a light construction material or a ceramic ware.

EXAMPLE 13

A steel slag, a fly ash and a clay were homogeneously mixed with sufficient water to form a ceramic composition according to the present example. The ceramic composition comprised by weight part of the steel slag, 30 by weight part of the fly ash and 20 by weight part of the clay. The steel slag is generated by the steel manufacturing process.

The steel slag had a massive shape at first and the steel slag contained large particles having sizes of several millimeters after the steel slag was grinded. Therefore, a sieving step or a sufficient milling step was demanded for the steel slag so as to obtain a homogeneous slip. In the present example, the clay, the fly ash and the steel slag were mixed in order with sufficient water, and then the mixture was grinded by using a ball mill for about 4 hours to manufacture the homogeneous and stable slip.

Subsequently, a shaped body was formed by an extrusion method, an injection molding method or a pressing method, and then the shaped body was dried at about 50° C. for above 24 hours after the shaped body was inserted into a box furnace. The relative humidity was maintained about 80% during the drying step. Nextly, the shaped body was sintered in the furnace to manufacture a sintered body. The sintering process was performed at a temperature of about 1200° C.

In the present example, the heavy metal eruption test was not executed. The sample block was made by using the ceramic composition of the present example and the dimension of the sample block was identical to the block of the example 5. The bulk specific gravity and the compressive strength of the sample block are stated in table 10.

TABLE 10

| property | bulk specific gravity (g/cm³) | compressive strength (psi) |
|---|---|---|
| Example 13 | 3.04 | 29,800 |
| Example 14 | 2.96 | 28,800 |
| Example 15 | 2.88 | 25,524 |
| Example 16 | 2.86 | 23,701 |

As shown in the table 10, the sample block has a relatively large bulk gravity but the sample block has a compressive strength of about 29,800 psi which is greater than the standard compressive strength of 1,500 psi suggested by the ASTM C62, so the sample block of the present example is suitable to the building material or the engineering material. Also, the sample block of the present example has a deep black color and has a lustrous appearance by controlling the amount of the steel slag. Hence, the sample block can be used as a ceramic ware such as a tile or a porcelain.

EXAMPLE 14

In order to manufacture a ceramic composition made from waste materials, a steel slag, a fly ash and a clay were homogeneously mixed with sufficient water. The ceramic composition of the present example comprised 40 by weight part of the steel slag, 30 by weight part of the fly ash and 30 by weight part of the clay. The successive manufacturing steps were the same as those of the example 13.

In the present example, the sample block was made by using the ceramic composition and the dimension of the sample block was identical to the block of the example 5. The bulk specific gravity and the compressive strength of the sample block are stated in the table 10.

Referring to the table 10, the sample block of the present example has a relatively large bulk gravity of about 2.96 g/cm$^3$, however, the sample block has a compressive strength of about 28,800 psi which is greater than the standard compressive strength suggested by the ASTM C62. Therefore, the sample block of the present example is suitable to the building material or the engineering material.

EXAMPLE 15

For manufacturing a ceramic composition made from waste materials, a steel slag, a fly ash and a clay were homogeneously mixed with sufficient water. The ceramic composition of the present example comprised 30 by weight part of the steel slag, 30 by weight part of the fly ash and 40 by weight part of the clay. The successive manufacturing steps were the same as those of the example 13.

In the present example, the sample block was made by using the ceramic composition and the dimension of the sample block was identical to the block of the example 5. The bulk specific gravity and the compressive strength of the sample block are stated in the table 10.

Referring to the table 10, the sample block of the present example has a relatively large bulk gravity of about 2.88 g/cm$^3$, however, the sample block has a compressive strength of about 25,524 psi, so the sample block of the present example is suitable to the building material or the engineering material.

EXAMPLE 16

In order to manufacture a ceramic composition made from waste materials, a steel slag, a fly ash and a clay were homogeneously mixed with sufficient water. The ceramic composition of the present example comprised 20 by weight part of the steel slag, 40 by weight part of the fly ash and 40 by weight part of the clay. The successive manufacturing steps were the same as those of the example 13.

In the present example, the sample block was made by using the ceramic composition and the dimension of the sample block was identical to the block of the example 5. The bulk specific gravity and the compressive strength of the sample block are stated in the table 10.

Referring to the table 10, the sample block of the present example has a relatively large bulk gravity of about 2.86 g/cm$^3$, however, the sample block has a compressive strength of about 23,701 psi, so the sample block of the present example is suitable to the building material or the engineering material. Also, as it is described above, the sample block of the present example has a deep black color and has a lustrous appearance by controlling the amount of the steel slag. Therefore, the sample block can be used as a ceramic ware such as a tile or a porcelain.

EXAMPLE 17

For manufacturing a ceramic composition made from waste materials, an EAF dust, a steel slag, a fly ash and a clay were homogeneously mixed with sufficient water. The ceramic composition of the present example comprised 20 by weight part of the EAF dust, 50 by weight part of the steel slag, 20 by weight part of the fly ash and 10 by weight part of the clay. The EAF dust and the steel slag contain heavy metals such as copper, zinc, iron, chrome, arsenic and manganese and the fly ash may include the heavy metals.

In the present example, the mixing procedure was identical to the example 1, however, the mixture was grinded with a ball mill for about 4 hours in order to form a homogeneous and stable slip. Namely, the EAF dust was primarily mixed with the water and the fly ash was added. Then, the steel slag was mixed after the clay was added. The forming process, the drying process and the sintering process were the same as those of the example 1.

In the present example, the result of the heavy metal eruption test of the sintered body was mentioned in table 11. Table 11 is the result of the heavy metal eruption test by using the ceramic composition comprising the EAF dust and the steel slag. In the table 11, the heavy metal eruption amounts from the sintered body were measured by the unit of p.p.m.

TABLE 11

| heavy metal | chrome | iron | zinc | copper | arsenic | manganese |
| --- | --- | --- | --- | --- | --- | --- |
| permissible limit | 0.5 | 2.0 | 1.0 | 0.5 | 0.1 | 2.0 |
| Example 17 | 0.12 | 0.08 | 0.07 | 0.0 | 0.034 | 0.02 |
| Example 18 | 0.11 | 0.09 | 0.06 | 0.0 | 0.033 | 0.02 |
| Example 19 | 0.03 | 0.13 | 0.03 | 0.0 | 0.024 | 0.0 |
| Example 20 | 0.05 | 0.14 | 0.035 | 0.0 | 0.028 | 0.0 |

Referring to the table 11, the sintered body of the present invention sufficiently meets the criterion of the heavy metal eruption permissible limits of the USEPA.

In the meantime, a sample was made by using the sintered body of the ceramic composition according to the present example. The sample had a rectangular hexahedral shape as a block and had a dimension of 30 cm×30 cm×60 cm. That is, the sample had the shape of the block 30 cm in width, 30 cm in length and 60 cm in height. The properties of the sample are disclosed in table 12. Table 12 states the bulk specific gravity and the compressive strength of the samples according to several examples.

TABLE 12

| property | bulk specific gravity (g/cm$^3$) | compressive strength (psi) |
| --- | --- | --- |
| Example 17 | 2.82 | 22,025 |
| Example 18 | 2.77 | 20,351 |
| Example 19 | 2.73 | 21,208 |
| Example 20 | 2.68 | 22,563 |

Referring to table 12, the block sample of the present example has a high compressive strength of about 22,025 psi and a relatively low bulk specific gravity of about 2.82 g/cm$^3$ Hence, the block of the present example is sufficiently available as a building material or an engineering material.

EXAMPLE 18

An EAF dust, a steel slag, a fly ash and a clay were mixed with sufficient water in order to produce a ceramic composition made from waste materials. The ceramic composition comprised 20 by weight part of the EAF dust, 40 by weight part of the steel slag, 20 by weight part of the fly ash and 20 by weight part of the clay according to the present example. The homogeneous slip of the present example was made by grinding the mixed ceramic composition for about 4 hours as it is described above. In the present example, the EAF dust was mixed sufficient water first and the fly ash was added secondly. Then, the clay was added and the steel slag was finally mixed. After that time, the manufacturing process was the same as that of the example 13.

In the present example, the sintered body of the ceramic composition was tested under the criterion of the USEPA. The measured amounts of erupted heavy metals from the sintered body were stated as shown in the table 11. Referring to the table 11, the sintered body of the present invention meets various permissible limits of heavy metal eruption under the TCLP of the USEPA.

Also, the block sample of the present invention was made of the ceramic composition and properties were measured as shown in the table 12. The dimension and the shape of the sample of the present example were identical to those of the example 17. The block sample has a compressive strength of about 20,351 psi and a bulk specific gravity of about 2.77 g/cm$^3$ which are superior to the ordinary block. Therefore, the block sample of the present example can be used for an excellent building material or an excellent engineering material.

EXAMPLE 19

In order to manufacturing a ceramic composition made from waste materials, an EAF dust, a steel slag, a fly ash and a clay were homogeneously mixed with sufficient water. In the present example, the ceramic composition comprised 30 by weight part of the EAF dust, 30 by weight part of the steel slag, 20 by weight part of the fly ash and 20 by weight part of the clay. The homogeneously stable slip of the present example was made by grinding the mixed ceramic composition for about 3 hours as described above. In the case of the present example, the EAF dust was mixed water first and the fly ash was added secondly. Then, the clay was added and the steel slag was finally mixed. After that time, the manufacturing process was the same as that of the example 13.

According to the present example, the heavy metal eruption amounts from the sintered body of the ceramic composition were tested under the criterion of the USEPA. The measured amounts of erupted heavy metals from the sintered body were mentioned in the table 11.

Referring to the table 11, the sintered body of the present example meets various permissible heavy metal eruption limits of the TCLP of the USEPA.

Also, the block sample of the present example was made of the ceramic composition and properties were measured as shown in the table 12. The dimension and the shape of the sample of the present example were identical to those of the example 17. The block sample has a compressive strength of about 21,208 psi and a bulk specific gravity of about 2.73 g/cm$^3$ which are superior to ordinary blocks for building. Hence, the block sample of the present example can be used for an excellent building material or an excellent engineering material.

EXAMPLE 20

In the present example, an EAF dust, a steel slag, a fly ash and a clay were mixed with sufficient water so as to manufacture a ceramic composition made from waste materials. The ceramic composition of the present example comprised 30 by weight part of the EAF dust, 20 by weight part of the steel slag, 20 by weight part of the fly ash and 30 by weight part of the clay. The homogeneous slip was made by grinding the mixed ceramic composition for about 2 hours after the ingredients of the ceramic composition were mixed in order as it is described above. The successive manufacturing process was the same as that of the example 13.

In the present example, the result of the eruption test for the sintered body of the ceramic composition was listed in the table 11. Referring to the table 11, the sintered body of the present example meets various permissible limits of heavy metal eruption under the TCLP of the USEPA.

The block sample of the present example was made of the ceramic composition and properties were measured as shown in the table 12. The dimension and the shape of the sample of the present example were identical to those of the example 17. The block sample has a compressive strength of about 22,563 psi and a bulk specific gravity of about 2.68 g/cm$^3$ which are superior to the ordinary block for building. Therefore, the block sample of the present example can be used for an excellent building material or an excellent engineering material.

EXAMPLE 21

A clay, a fly ash, a paper ash and a steel slag were mixed in order with sufficient water to form a ceramic composition made from waste materials according to the present example. The ceramic composition of the present example comprised 50 by weight part of the steel slag, 20 by weight part of the paper ash, 20 by weight part of the fly ash and 10 by weight part of the clay. In the present example, the homogeneous and stable slip was obtained by mixing the ingredients of the ceramic composition and grinding the ceramic composition with a ball mill for about 4 hours. The successive manufacturing process of the present example was the same as that of the example 17.

Table 13 shows the properties of the block made by using the ceramic composition of the present example. The block had a rectangular hexahedral shape during the forming and the sintering processes according to the present example.

TABLE 13

| property | bulk specific gravity (g/cm$^3$) | compressive strength (psi) |
| --- | --- | --- |
| Example 21 | 2.52 | 23,956 |
| Example 22 | 2.44 | 22,674 |
| Example 23 | 2.40 | 20,374 |
| Example 24 | 2.32 | 21,172 |

As shown in the table 13, the block of the present example had a good compressive strength of about 23,956 psi and a low bulk specific gravity of about 2.52 g/cm$^3$ which are superior to normal building blocks. Hence, the block of the present example sufficiently meets the criterion of 1,500 psi as suggested in the ASTM. Also, the sintered block has various lusters according to control the amount of the steel slag, so the sintered block has an excellent appearance when the block is used as the building material. Therefore, the block of the present example is applied for a good building and engineering materials since it has an excellent mechanical strength and a beautiful appearance.

EXAMPLE 22

In order to manufacture a ceramic composition made from waste materials, a steel slag, a paper ash, a fly ash and a clay were mixed with sufficient water. The ceramic composition of the present example comprised 40 by weight part of the steel slag, 20 by weight part of the paper ash, 20 by weight part of the fly ash and 20 by weight part of the clay. The steel slag included heavy metals and the fly and the paper ashes also may include the heavy metals.

According to the present example, the clay was primarily mixed with the water and the fly ash was added. Subsequently, the paper ash was added and the steel slag was finally mixed. Then, the ceramic composition was grinded by using a ball mill for about 4 hours so as to make a stable and homogeneous slip. In the present example, the forming, the drying and the sintering processes were the same as the example 17.

During the forming process, the ceramic composition became the shaped body having a rectangular hexahedral block shape, so the sintered body also had the block shape.

The bulk specific gravity and the compressive strength were measured as stated in the table 13. Referring to the table 13, the block of the present example has an excellent compressive strength of about 22,674 psi and a low bulk specific gravity of about 2.44 g/cm$^3$. The standard compressive strength of a block is about 1,500 psi according to the ASTM, so the block of the present example is greatly suitable to the building materials. The block comprising the steel slag represents deep black color according to control the amount of the steel slag in the ceramic composition, so the block has a beautiful appearance when it is used as the building material. Furthermore, the block is shiny or dull by controlling the amount of the steel slag in the ceramic composition and the block has a high mechanical strength, so the block is sufficiently applied for ceramic ware such as the tile or the pottery.

EXAMPLE 23

A clay, a fly ash, a paper ash and a steel slag were mixed in order with sufficient water according to the above described method to manufacture a ceramic composition made from waste materials. The ceramic composition comprised 30 by weight part of the steel slag, 30 by weight part of the paper ash, 20 by weight part of the fly ash and 20 by weight part of the clay.

The ceramic composition was grinded by using a ball mill for about 4 hours so as to obtain a homogeneously stable slip. The forming, the drying and the sintering processes were identical to the example 17. The ceramic composition had a rectangular hexahedral block shape during the forming and the sintering processes, so the sintered body also had the block shape.

The bulk specific gravity and the compressive strength were measured as shown in the table 13. Referring to the table 13, the block of the present example has an excellent compressive strength of about 20,374 psi and a low bulk specific gravity of about 2.40 g/cm$^3$. The standard compressive strength of a block is about 1,500 psi according to the ASTM, so the block of the present example is sufficiently suitable to the building materials.

EXAMPLE 24

For manufacturing a ceramic composition made from waste materials, a steel slag, a paper ash, a fly ash and a clay were mixed with sufficient water. The ceramic composition comprised 20 by weight part of the steel slag, 30 by weight part of the paper ash, 20 by weight part of the fly ash and 30 by weight part of the clay. The steel slag includes heavy metals and the fly and the paper ashes may contain the heavy metals.

At first, the clay was mixed with the water and then the fly ash was added. Nextly, the steel slag was added after the paper ash was mixed. Subsequently, the ceramic composition was grinded by using a ball mill for about 4 hours, so homogeneous and stable slip was produced. In the present example, the forming process, the drying process and the sintering process were identical to the above described processes of the example 17.

The bulk specific gravity and the compressive strength were mentioned in the table 13. Referring to the table 13, the block of the present example has an excellent compressive strength of about 21,172 psi and a low bulk specific gravity of about 2.32 g/cm$^3$. The standard compressive strength of a block is about 1,500 psi according to the ASTM, so the block of the present example is greatly suitable to the building materials.

As it is described above, the waste materials including the hazardous heavy metals are effectively and economically recycled as building materials or engineering materials without causing environmental pollution since the ceramic composition of the present invention is made from waste materials such as the EAF dust, the steel slag or the aluminum dross and the sample block produced by using the ceramic composition has excellent characteristics such as a sufficient mechanical strength and a low bulk specific gravity.

While the present invention has been particularly shown and described with reference to particular embodiments thereof, it will be understood by those skilled in the art that various changes in form and detail may be effected therein without departing from the spirit and scope of the invention as defined by the appended claims.

What is claimed is:

1. A ceramic composition made from waste materials comprising:

between about 5 and about 75 by weight part of a solid state waste material having heavy metals therein, said solid waste material comprising at least one selected from the group consisting of an electric arc furnace dust, a steel slag and a paper ash, between about 15 and about 45 weight part of a fly ash, and between about 5 and about 55 by weight part of a clay.

2. The ceramic composition made from waste materials as claimed in claim 1, wherein said ceramic composition further comprises between about 5 and about 15 by weight part of an aluminum dross.

3. A ceramic composition made from waste materials comprising:

between about 5 and about 55 by weight part of an electric arc furnace dust, between about 5 and 15 by weight part of a paper ash, between about 15 and about 45 by weight part of a fly ash, and between about 15 and about 55 by weight part of a clay.

4. The ceramic composition made from waste materials as claimed in claim 3, wherein said ceramic composition further comprises between about 5 and about 15 by weight part of an aluminum dross.

5. A ceramic composition made from waste materials comprising between about 25 and about 40 by weight part of a fly ash, between about 15 and about 55 by weight part of a paper ash and between about 15 and about 50 by weight part of a clay.

6. A ceramic composition made from waste materials comprising between about 15 and about 55 by weight part of a steel slag, between about 15 and about 45 by weight part of a fly ash, and between about 5 and about 45 by weight part of a clay.

7. The ceramic composition made from waste materials as claimed in claim 6, wherein said ceramic composition further comprises between about 15 and about 35 by weight part of an electric arc furnace dust.

8. The ceramic composition made from waste materials as claimed in claim 6, wherein said ceramic composition further comprises between about 15 and about 35 weight part of a paper ash.

9. A building material comprised of the ceramic composition according to claim 1.

10. A building material comprised of the ceramic composition according to claim 3.

11. A building material comprised of the ceramic composition according to claim 5.

12. A building material comprised of the ceramic composition according to claim 6.

* * * * *